(12) United States Patent  
Claus

(10) Patent No.: US 9,312,719 B2
(45) Date of Patent: Apr. 12, 2016

(54) ENERGY STORE AND ENERGY STORAGE SYSTEM

(75) Inventor: Holger Claus, Stuttgart (DE)

(73) Assignee: ROBERT BOSCH GMBH, Stuttgart (DE)

(*) Notice: Subject to any disclaimer, the term of this patent is extended or adjusted under 35 U.S.C. 154(b) by 297 days.

(21) Appl. No.: 14/004,384

(22) PCT Filed: Jan. 12, 2012

(86) PCT No.: PCT/EP2012/050447
§ 371 (c)(1),
(2), (4) Date: Nov. 19, 2013

(87) PCT Pub. No.: WO2012/123139
PCT Pub. Date: Sep. 20, 2012

(65) Prior Publication Data
US 2014/0070771 A1    Mar. 13, 2014

(30) Foreign Application Priority Data
Mar. 11, 2011 (DE) .......... 10 2011 005 417

(51) Int. Cl.
*H02J 7/00* (2006.01)
*H01M 2/34* (2006.01)
*H01M 10/42* (2006.01)
*H01M 10/44* (2006.01)

(52) U.S. Cl.
CPC ........... *H02J 7/0068* (2013.01); *H01M 2/34* (2013.01); *H01M 10/4257* (2013.01); *H01M 10/44* (2013.01); *H02J 7/0063* (2013.01); *H02J 2007/0067* (2013.01)

(58) Field of Classification Search
CPC ............ H02J 7/0068; H02J 2007/0067; H02J 7/0063; H01M 10/4257; H01M 10/44; H01M 2/34

USPC ......................................................... 320/128
See application file for complete search history.

(56) References Cited

U.S. PATENT DOCUMENTS

| | | | |
|---|---|---|---|
| 5,783,998 A | | 7/1998 | Nakajou et al. |
| 6,924,624 B2 * | | 8/2005 | Baur ............ H02J 7/0031 320/132 |
| 2003/0137279 A1 | | 7/2003 | Baur et al. |
| 2003/0155890 A1 | | 8/2003 | Roepke et al. |
| 2005/0077878 A1 | | 4/2005 | Carrier et al. |
| 2006/0087286 A1 | | 4/2006 | Phillips et al. |
| 2009/0145945 A1 | | 6/2009 | Heinzen |

FOREIGN PATENT DOCUMENTS

| | | |
|---|---|---|
| CN | 101682197 | 3/2010 |
| EP | 1 337 025 | 8/2003 |
| EP | 1 780 867 | 5/2007 |

OTHER PUBLICATIONS

International Search Report for PCT/EP2012/050447, issued on Sep. 26, 2012.

* cited by examiner

*Primary Examiner* — Jack Chiang
*Assistant Examiner* — Brandon Bowers
(74) *Attorney, Agent, or Firm* — Kenyon & Kenyon LLP

(57) ABSTRACT

A chargeable energy store includes a chargeable electrical accumulator, an interface for connecting the accumulator to a device for the exchange of energy and a control unit for controlling the energy exchange of the accumulator. The control unit includes a supply voltage terminal, which is connected to the accumulator when a device is connected to the interface for the exchange of energy, and which is otherwise disconnected from the accumulator.

9 Claims, 2 Drawing Sheets

ENERGY STORE AND ENERGY STORAGE SYSTEM

FIELD OF THE INVENTION

The present invention relates to a chargeable electrical energy store and to a system having the energy store.

BACKGROUND INFORMATION

In the area of small electrical devices it is customary to use electrical energy stores that are separable from the small device in order to be recharged. During the charging process, an additional energy store may be inserted into the small device such that the latter may continue to be operated during the charging process. Frequently it is also possible to use the energy store interchangeably in different small electrical devices, for example in a battery-operated screwdriver and in a lamp.

Known energy stores include a control unit, which monitors both a charging process as well as a discharging process of the energy store. This is to improve an energy management and reduce the danger of damaging or destroying one of the devices or the energy store due to incorrect charging or discharging. The control unit is developed as an electronic circuit and monitors parameters such as one or more cell voltages of an accumulator of the energy store as well as, if applicable, one or more cell temperatures. For the purpose of exchanging information, the control unit may be connectable to another control unit, which is situated in the small device or the charger. The control unit is normally operated by the electrical energy of the accumulator, components especially being used in the construction of the control unit that have a low power consumption or a special power-saving mode ("sleep mode") in order to avoid discharge when storing the unit.

European Published Patent Appln. No. 1 337 025 shows a charger for an electrical energy store, which is electrically disconnected from a supply mains if no energy store is inserted into the charger, in order to minimize an energy consumption of the charger outside of the charging operation.

A current consumption of the control unit, however, occurs even when the energy store is not connected to a device. In the course of a longer storage period, the performance of the energy store may be impaired by the discharging of the control unit. In unfavorable circumstances, the accumulator of the energy store may even be exhaustively discharged by the control unit and thus damaged or even destroyed.

SUMMARY

The present invention is based on the objective of indicating an energy store and an energy storage system, which allows the energy store to be stored even for a longer period.

An energy store chargeable in accordance with the present invention includes a chargeable electrical accumulator, an interface for connecting the accumulator to a device for the exchange of energy and a control unit for controlling the energy exchange of the accumulator. The control unit includes a supply voltage terminal, which is connected to the accumulator when a device is connected to the interface for the exchange of energy, and which is otherwise disconnected from the accumulator.

The disconnection of the supply voltage terminal of the control unit from the accumulator, while the energy store is not in use, prevents the accumulator from being discharged during this time by the control unit.

Storing the energy store outside of a device for the exchange of energy is thus unproblematic. It is thus possible to maximize an energy obtainable by the device from the energy store. This also makes it possible to use in the construction of the control unit that are not characterized by particularly low energy consumption or a particularly power-saving mode ("sleep mode"). A selection of components may thereby be simplified and the manufacturing costs for the control unit may be lowered.

In a first specific embodiment, the interface includes a first conductive element, which is connected to the accumulator, as well as a second conductive element separated from the first conductive element, which is connected to the supply voltage terminal, the two conductive elements being situated on the interface in such a way that they are able to be contacted jointly by a corresponding conductive element of the device for the exchange of energy.

The two conductive elements of the energy store are thus electrically connected to each other only when the energy store is inserted into the device. This simple arrangement requires no additional components and may be realized in a cost-effective manner.

The first conductive element may be developed to transmit energy between the device and the accumulator. The first conductive element may be a charging terminal of the accumulator such that compared to a known chargeable energy store an additional expenditure may be limited to the second element. This makes it possible to keep the costs of development and manufacturing for the energy store low.

In a second specific embodiment, a switch is situated in the area of the interface, which is developed to connect the supply voltage terminal of the control unit to the accumulator when a device for energy exchange is present on the interface. The switch is preferably a push-button switch, which electrically disconnects the supply voltage terminal from the accumulator when the push-button switch is not actuated by the device on the interface.

In this specific embodiment, the number of conductive elements on the interface may be left unchanged. This makes it possible to reduce a danger of an unintentional contacting or short-circuiting of conductive elements of the interface.

In both of the described specific embodiments, the control unit may have another supply voltage terminal, which is permanently connected to the accumulator. The activation or deactivation of the control unit via the switch or via the conductive elements is thus limited to only one of the supply voltage terminals. The additional supply voltage terminal may be connected to a ground terminal of the accumulator. The switched supply voltage terminal of the control unit thus concerns a positive supply voltage. This construction is customary and particularly simple, which further allows manufacturing costs to be kept low.

A system for the storage of energy includes the described energy store and a device for the exchange of energy, which is developed to be connected to the interface in such a way that the supply voltage terminal of the control unit is connected to the accumulator.

The device preferably includes at least one charger and/or an electrical consumer operable by the accumulator. The system may thus be designed flexibly for an interaction of one or multiple energy stores on one or more devices. For this purpose, the energy store may be developed electrically and mechanically for operation in a multitude of alternative devices and multiple energy stores may differ for example in their energy storage capacity.

DETAILED DESCRIPTION

Figure 1:
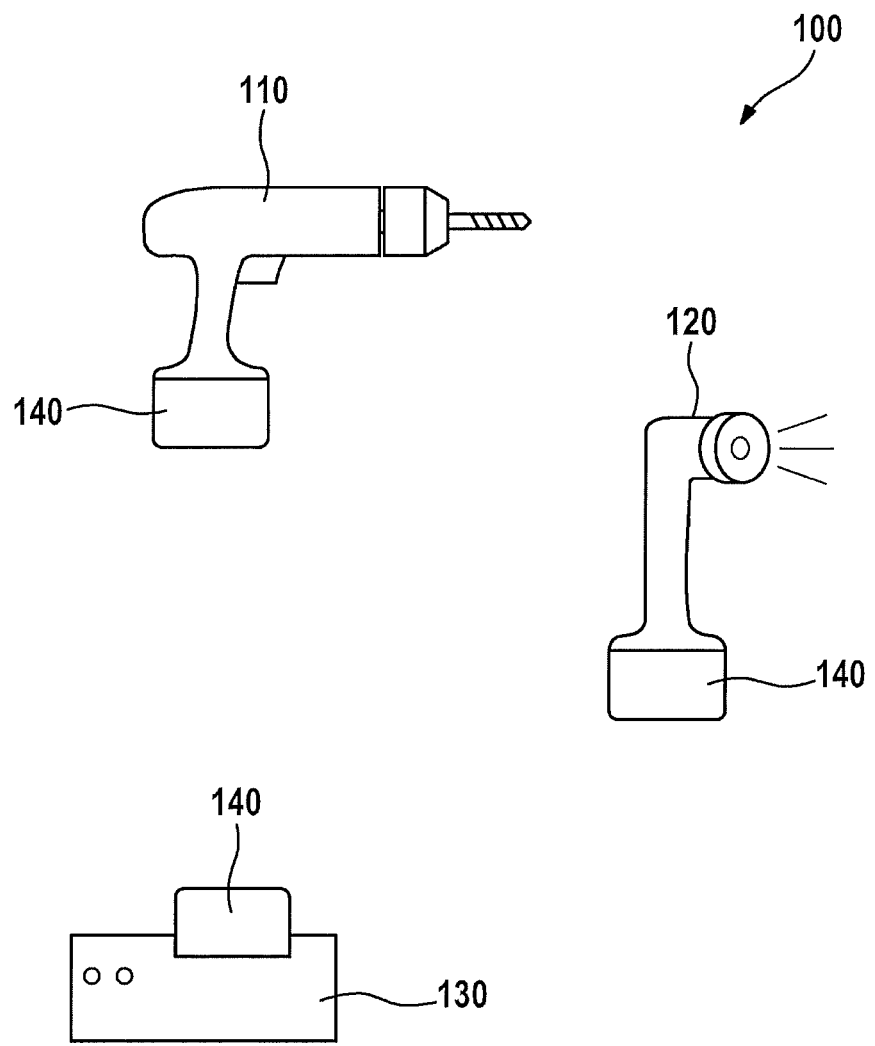
FIG. 1 shows a system of different devices having mutually interchangeable energy stores.

FIG. 1 shows a system 100 of different devices. The system includes a battery-operated screwdriver 110, a lamp 120 and a charger 130 as well as a number of energy stores 140. An energy store in the form of a battery pack 140 is attached on each one of devices 110 through 130. Battery-operated screwdriver 110 and lamp 120 represent electrical consumers, which are operable by the electrical energy stored in battery pack 140. Charger 130 is used to store electrical energy in battery pack 140 for later withdrawal by one of the consumer devices 110 or 120.

Battery pack 140 is mechanically and electrically developed to be connected to each one of devices 110 through 130. If more than only one battery pack 140 is available, then at least one of consumer devices 110, 120 may be used with one of battery packs 140, while at the same time another battery pack 140 is being charged in charger 130. If required, additional battery packs 140 may be kept in reserve in a charged state for later use.

The devices 110 through 130 represented in FIG. 1 are of an exemplary nature. In other specific embodiments, more or fewer and in particular also other devices 110 through 130 may be combinable with battery pack 140. This may also include a device that is designed both to charge as well as discharge battery pack 140.

Figure 2:
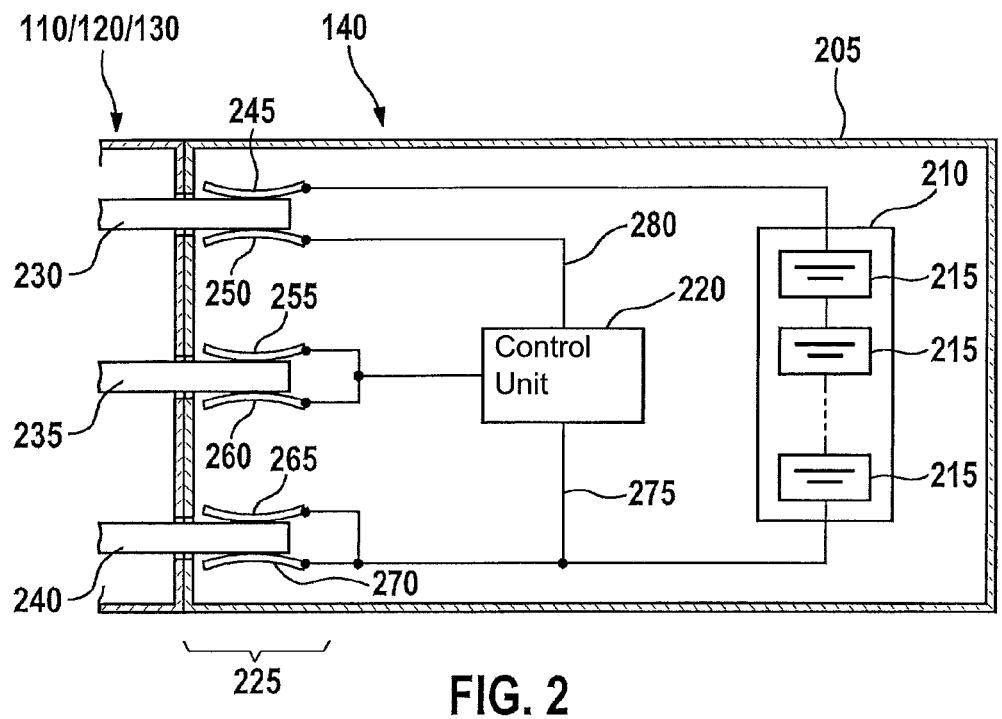
FIG. 2 shows a schematic representation of one of the energy stores from FIG. 1.

FIG. 2 shows a schematic view of energy store 140 from FIG. 1. Energy store 140 is connected to one of devices 110 through 130 of system 100 from FIG. 1. The view of FIG. 2 essentially represents a cross-sectional drawing, some elements of battery pack 140 being shown merely as electrical circuit symbols.

Battery pack 140 includes a housing 205, in which an accumulator 210 having a plurality of cells 215 and a control unit 220 are situated. Battery pack 140 furthermore includes within housing 205 an interface 225 for connecting battery pack 140 to one of devices 110 through 130 from FIG. 1. Interface 225 may also include a mechanical attachment of battery pack 140 on device 110 through 130, which is not shown in FIG. 2.

Interface 225 is developed to establish an electrical contact to a first contact pin 230, a second contact pin 235 and a third contact pin 240 of one of devices 110 through 130. First contact pin 230 of device 110 through 130 makes contact with two mutually opposite sheet metal conductors 245 and 250 of battery pack 140. Analogously, second contact pin 235 is situated between sheet metal contacts 255 and 260 and third contact pin 240 is situated between sheet metal contacts 265 and 270.

Mutually opposite sheet metal contacts 255 and 260 and 265 and 270, respectively, are electrically connected to each other in pairwise fashion. In other specific embodiments, the second contact pin 235 and/or the third contact pin 240 may be contacted respectively by only one sheet metal contact 255 through 270 of interface 225 of battery pack 140. The sheet metal contacts may engage on each of contact pins 230-240 optionally also on the end face.

Sheet metal contacts 265 and 270 are connected to a negative terminal of accumulator 210 and a negative supply voltage terminal 275 of control unit 220. Sheet metal contacts 255 and 260 are connected to a communication terminal of control unit 220. An electrical connection is established between battery pack 140 and device 110 through 130 by way of the communication terminal, which allows for an exchange of data. On the basis of the transmitted data, an internal or external control system is able to control the transmission of energy between battery pack 140 and device 110 through 130. Furthermore, information may be transmitted that may be displayed to a user of battery pack 140 via a display that is not shown in the drawing.

Conductive sheet metal 250 is connected to a positive supply voltage terminal 280 of the control unit and contact sheet metal 245 is electrically connected to a positive terminal of accumulator 210.

While battery pack 140 is attached to device 110 through 130, an electrical contact exists between first contact pin 230 and the two sheet metal contacts 245 and 250. Positive supply voltage terminal 280 of control unit 220 is thereby connected via conductive sheet metal 250, first contact pin 230 and conductive sheet metal 245 to the positive terminal of accumulator 210. If battery pack 140 is disconnected from device 110 through 130, then there no longer exists an electrical connection between conductive sheet metals 245 and 250 such that control unit 220 is not operated by electrical energy taken from accumulator 210. Battery pack 140 may thus be stored separately from device 110 through 130 without energy being drawn by control unit 220.

In place of contact pins 230 through 240, which engage in sheet metal contacts 245 through 270, any other contact elements between device 110 through 130 and battery pack 140 are conceivable as well such as bending reeds or spring contacts. What is decisive is that the electrical connection of the positive terminal of accumulator 210 to the positive supply voltage terminal 280 of control unit 220 occurs by a conductive element of device 110 through 130. This ensures that control unit 220 is disconnected from the positive terminal of accumulator 210 when battery pack 140 is not connected to any device 110 through 130. In another specific embodiment, the disconnection of control unit 220 may correspondingly occur also from a negative terminal of accumulator 210.

Figure 3:
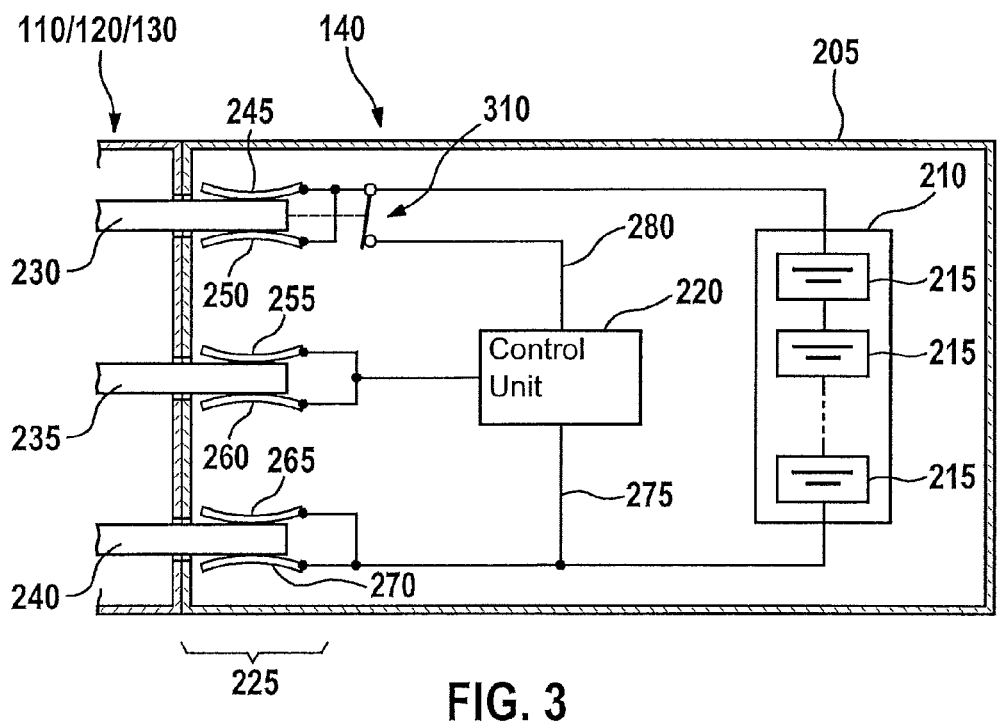
FIG. 3 shows another representation of one of the energy stores from FIG. 1.

FIG. 3 shows a representation of another specific embodiment of battery pack 140 from FIG. 1. The specific embodiment largely corresponds to the specific embodiment described above with reference to FIG. 2. In contrast to the latter, however, a push-button switch 310 is provided, of which a first terminal is connected to the positive supply voltage terminal 280 of control unit 220 and a second terminal to the positive terminal of accumulator 210. In addition, sheet metal contacts 245 and 250 are electrically connected to each other and both lead to the positive terminal of accumulator 210.

Push-button switch 310 is designed to be closed by first contact pin 230 of device 110 through 130. Positive supply voltage terminal 280 of control unit 220 is thereby connected to the positive terminal of accumulator 210 as long as battery pack 140 is mounted on device 110 through 130. If battery pack 140 is removed from device 110 through 130, then a built-in spring opens push-button switch 310 such that control unit 220 can no longer be operated by the energy of accumulator 210.

In alternative specific embodiments, another mechanical element of device 110 through 130 is provided for operating push-button switch 310. The element may include in particular second contact pin 235 or third contact pin 240. Furthermore, push-button switch 310 may also be operable for example by a projection of a housing of device 110 through 130 specifically developed for this purpose.

The represented push-button switch 310 is a single-pole closing push-button switch (single pole, single throw, normally open: SPSTNO). In another specific embodiment, push-button switch 310 may also be a two-pole closing push-button switch (double pole, double throw, normally open DPDTNO), the second pole being provided to establish or disconnect the electrical connection between control unit 220 and second contact pin 235 or negative supply voltage terminal 275 of control unit 220 and third contact pin 240. In corresponding fashion, a three-pole push-button switch (triple pole, triple throw, normally open, TPTTNO) is also possible for the complete disconnection or connection of control unit 220 and the described elements of battery pack 140.

What is claimed is:

1. A chargeable energy store, comprising:
   a chargeable electrical accumulator;
   an interface for connecting the accumulator with a device for an exchange of energy; and
   a control unit for controlling an energy exchange of the accumulator,
   wherein the control unit includes a supply voltage terminal that is connected to the accumulator when the device for energy exchange is connected to the interface for the exchange of energy, and that is otherwise disconnected from the accumulator,
   wherein the interface includes a first conductive element connected to the accumulator, the interface includes a second conductive element separated from the first conductive element and connected to the supply voltage terminal, and the first conductive element and the second conductive element are situated on the interface in such a way that the first conductive element and the second conductive element are able to be contacted jointly by a corresponding conductive element of the device for energy exchange.

2. The energy store as recited in claim 1, wherein the first conductive element transmits energy between the device for energy exchange and the accumulator.

3. The energy store recited in claim 1, further comprising:
   a switch situated in an area of the interface, wherein the switch connects the supply voltage terminal of the control unit to the accumulator when the device for energy exchange is situated on the interface.

4. The energy store as recited in claim 1, wherein the control unit includes another supply voltage terminal, the other supply voltage terminal being permanently connected to the accumulator.

5. The energy store as recited in claim 4, wherein the other supply voltage termind is connected to a ground terminal of the accumulator.

6. A system for energy storage, comprising:
   a device for an exchange of energy; and
   an energy store that includes:
     a chargeable electrical accumulator,
     an interface for connecting the accumulator with the device for the exchange of energy, and
     a control unit for controlling an energy exchange of the accumulator, wherein the control unit includes a supply voltage terminal that is connected to the accumulator when the device for energy exchange is connected to the interface for the exchange of energy, and that is otherwise disconnected from the accumulator,
     wherein the interface includes a first conductive element connected to the accumulator, the interface includes a second conductive element separated from the first conductive element and connected to the supply voltage terminal, and the first conductive element and the second conductive element are situated on the interface in such a way that the first conductive element and the second conductive element are able to be contacted jointly by a corresponding conductive element of the device for energy exchange.

7. The system as recited in claim 6, wherein the device for energy exchange includes a charger for the accumulator.

8. The system as recited in claim 6, wherein the device for energy exchange includes an electrical consumer operable by the accumulator.

9. The system as recited in claim 6, wherein the energy store is developed electrically and mechanically to be operated on a plurality of alternative devices for the exchange of energy.

* * * * *